US008437559B2

(12) United States Patent
Labbi et al.

(10) Patent No.: US 8,437,559 B2
(45) Date of Patent: May 7, 2013

(54) COMPUTER-IMPLEMENTED VISUALIZATION METHOD

(75) Inventors: Abderrahim Labbi, Zurich (CH); Michail Vlachos, Zurich (CH)

(73) Assignee: International Business Machines Corporation, Armonk, NY (US)

(*) Notice: Subject to any disclaimer, the term of this patent is extended or adjusted under 35 U.S.C. 154(b) by 378 days.

(21) Appl. No.: 12/907,069

(22) Filed: Oct. 19, 2010

(65) Prior Publication Data

US 2011/0097001 A1    Apr. 28, 2011

(30) Foreign Application Priority Data

Oct. 23, 2009 (EP) .................................. 09173945

(51) Int. Cl.
*G06K 9/62* (2006.01)
*G06K 9/68* (2006.01)

(52) U.S. Cl.
USPC ......................................... 382/225; 382/227

(58) Field of Classification Search .............. 382/225, 382/227
See application file for complete search history.

(56) References Cited

U.S. PATENT DOCUMENTS

| 6,049,797 | A * | 4/2000 | Guha et al. ............................ 1/1 |
| 6,100,901 | A * | 8/2000 | Mohda et al. ................. 345/440 |
| 6,972,786 | B1 * | 12/2005 | Ludwig ...................... 348/14.11 |
| 7,483,871 | B2 * | 1/2009 | Herz ..................................... 1/1 |
| 8,132,122 | B2 * | 3/2012 | Risch et al. ................... 715/850 |
| 2006/0184461 | A1 | 8/2006 | Mori |
| 2006/0218478 | A1 | 9/2006 | Nonclercq et al. |
| 2007/0166707 | A1 * | 7/2007 | Schadt et al. ....................... 435/6 |
| 2008/0077572 | A1 | 3/2008 | Boyle et al. |

OTHER PUBLICATIONS

Sung-Soo Kim, Sunhee Kwon, Dianne Cook, "Interactive visualization of hierarchical clusters using MDS and MST" Jul. 2000, vol. 51, Issue 1, pp. 39-51.*
J. C. Gower and G. J. S. Ross, "Minimum Spanning Trees and Single Linkage Cluster Analysis" Journal of the Royal Statistical Society. Series C (Applied Statistics), vol. 18, No. 1(1969), pp. 54-64.*
Johnson et al., "Tree-maps: A space filling approach to the visualization of hierarchical information structures", Proc. IEEE Visualization '91, Oct. 1991, 284-291.
Asahi et al., "Using treemaps to visualize the analytic hierarchy process", Information Systems Research, Dec. 1995, 357-375.
Lamping et al., "A Focus+Context Technique Based on Hyperbolic Geometry for Visualizing Large Hierarchies", Proc. ACM Conf. Human Factors in Computing Systems, May 7-11, 1995, 401-408.

(Continued)

*Primary Examiner* — Barry Drennan
*Assistant Examiner* — Utpal Shah
(74) *Attorney, Agent, or Firm* — Vazken Alexanian (57) ABSTRACT

A method, system and computer product for visualizing affinities between objects. The method includes the steps of: forming a representation of a minimum spanning tree where the minimum spanning tree connects the plurality of objects based on a pairwise distance between the plurality of objects; forming a hierarchical cluster of the plurality of objects where the hierarchical cluster includes a level; agglomerating the plurality of objects based on the pairwise distance; displaying a view of the representation of the minimum spanning tree in a graphical user interface; receiving a user selection of a parameter containing a hierarchical level; and identifying, in the view, a target cluster that corresponds to the hierarchical level; where at least one of the steps is carried out using a computer device so that affinities between the plurality of objects are visualized.

16 Claims, 7 Drawing Sheets

OTHER PUBLICATIONS

Langford et al., "A Global Geometric Framework for Nonlinear Dimensionality Reduction", Science, Dec. 2000, 2319-2323, vol. 290.

Weisstein, Eric W., "Minimum Spanning Tree." MathWorld—A Wolfram Web Resource, http://mathworld.wolfram.com/MinimumSpanningTree.html, 1999.

Blum et al., "A Triangulation Method for the Sequential Mapping of Points from N-Space to Two-Space", IEEE Transactions on Computers, 1977, 288-292, vol. C-26, Issue 3.

Lucchese et al., "Ownership Protection of Shape Datasets with Geodesic Distance Preservation", Proc. of EDBT, 2008, 276-286.

* cited by examiner

COMPUTER-IMPLEMENTED VISUALIZATION METHOD

CROSS-REFERENCE TO RELATED APPLICATION

This application claims priority under 35 U.S.C. §119 from European Patent Application No. 09173945.8 filed Oct. 23, 2009, the entire contents of which are incorporated herein by reference.

BACKGROUND OF THE INVENTION

The invention relates to the field of computer-implemented visualization methods and systems. More specifically, a data visualization technique which emphasizes affinities between objects is shown.

Today, data visualization is a task inherent to data analysis and data mining. Complex data such as large amounts of highly dimensional data intensify the need for advanced visualization techniques. Ideally, such techniques translate the original data structure into a more comprehensible structure where interrelations between objects become more apparent.

SUMMARY OF THE INVENTION

Accordingly, one aspect of the present invention provides a visualization method for visualizing affinities between a plurality of objects, the method including the steps of: forming a representation of a minimum spanning tree where the minimum spanning tree connects the plurality of objects based on a pairwise distance between the plurality of objects; forming a hierarchical cluster of the plurality of objects where the hierarchical cluster includes a level; agglomerating the plurality of objects based on the pairwise distance; displaying a view of the representation of the minimum spanning tree in a graphical user interface; receiving a user selection of a parameter containing a hierarchical level; and identifying, in the view, a target cluster that corresponds to the hierarchical level; where at least one of the steps is carried out using a computer device so that affinities between the plurality of objects are visualized.

Another aspect of the present invention provides a system for visualizing affinities between a plurality of objects, the system including: a forming module adapted to form a representation of a minimum spanning tree where the minimum spanning tree connects the plurality of objects based on a pairwise distance between the plurality of objects; a forming module adapted to form a hierarchical cluster of the plurality of objects where the hierarchical cluster includes a level; an agglomerating module adapted to agglomerate the plurality of objects based on the pairwise distance; a displaying module adapted to display a view of the representation of the minimum spanning tree in a graphical user interface; a receiving module adapted to receive a user selection of a parameter containing a hierarchical level; and an identifying module adapted to identify, in the view, a target cluster that corresponds to the hierarchical level.

Another aspect of the present invention provides a computer readable storage medium tangibly embodying a computer readable program code having computer readable instructions which when implemented, cause a computer to carry out the steps of: forming a representation of a minimum spanning tree where the minimum spanning tree connects the plurality of objects based on a pairwise distance between the plurality of objects; forming a hierarchical cluster of the plurality of objects where the hierarchical cluster includes a level; agglomerating the plurality of objects based on the pairwise distance; displaying a view of the representation of the minimum spanning tree in a graphical user interface; receiving a user selection of a parameter containing a hierarchical level; and identifying, in the view, a target cluster that corresponds to the hierarchical level.

DETAILED DESCRIPTION OF THE PREFERRED EMBODIMENTS

Many data visualization techniques have been introduced in the recent years. For instance, some known techniques put emphasis on pairwise distances between objects, where other techniques, such as hierarchical clustering, focus on cluster information.

These so-called "information visualization" techniques aim at providing visual representation of large-scale collections of non-numerical information, such as files and lines of code in software systems. In addition, these techniques make use of graphical techniques to help in understanding and analyzing data. Information visualization focuses on abstract data sets, such as unstructured text or points in high-dimensional spaces that do not have an inherent 2D or 3D geometrical structure.

More generally, in computer graphics sciences, visualization techniques today have expanding applications in every domain. Some examples of these visualization techniques are:

Treemaps: treemapping aims at displaying tree-structured data by means of nested rectangles. For details please see JOHNSON et al., "Tree-maps: A space filling approach to the visualization of hierarchical information structures", Proc. IEEE Visualization '91, October 1991, 284-291 and ASAHI et al., "Using treemaps to visualize the analytic hierarchy process", Information Systems Research, December 1995, 357-375.

Hyperbolic trees or "hypertrees", defining visualization methods for graphs inspired by hyperbolic geometry. For details please see LAMPING et al., "A Focus+Context Technique Based on Hyperbolic Geometry for Visualizing Large Hierarchies", Proc. ACM Conf. Human Factors in Computing Systems, May 7-11, 1995, 401-408;

Isomap: this approach aims at discovering nonlinear degrees of freedom that underlie complex natural observations, such as human handwriting or images of a face under different viewing conditions. For details please see LANGFORD et al., "A Global Geometric Framework for Nonlinear Dimensionality Reduction", Science, December 2000, 2319-2323, vol. 290;

Furthermore, 2D and 3D modeling, and 3D rendering sciences have stimulated various visualization techniques. A compelling example is the hierarchical layout disclosed in US 2006218478 A1. At a given level in a hierarchy, displayed 3D objects are distributed according to respective weights. The weight of a displayed object depends on the number of displayed descendants in the hierarchy.

In addition, there are the concepts of a spanning tree and a minimum spanning tree. In short, a spanning tree connects all the vertices of a connected, undirected graph which can have many different spanning trees. By assigning a weight to each edge, a weight can be computed for any spanning tree of a graph as a sum of the weights of its edges. A minimum spanning tree (or MST) is a spanning tree whose weight is less than or equal to that of any other spanning tree. The minimum spanning tree of a weighted graph of N nodes is a set of N−1 edges of minimum total weight which form a spanning tree of the graph. For more details, please see Weisstein, Eric W., "Minimum Spanning Tree", MathWorld—A Wolfram Web Resource, http://mathworld.wolfram.com/MinimumSpanningTree.html.

Dendrograms are tree diagrams used to depict arrangements of clusters which result from hierarchical clustering. The result is sometimes described as a branching diagram representing a hierarchy of categories based on the number of shared characteristics, especially in biological taxonomy.

The present invention is directed at an interactive object visualization method. The basic idea is to display objects as a specific representation of a MST. The MST is computed from pairwise distances between objects. Agglomerative, hierarchical clusters of objects, such as the closest objects, are identified in the same view as the objects. The cluster hierarchy is derived consistently with the pairwise distances. The depicted clusters correspond to levels determined by a parameter such as a threshold which the user can modify interactively. For example, the user can change the zoom level of the agglomerative clusters identified in the view. The resulting interactive method allows for a consistent visualization of affinities between objects together with cluster information. Additional features can be embodied which notably ensure that the identified clusters do not overlap, irrespective of the threshold selected, providing a compelling partition of the information represented. To achieve this, the order chosen for agglomerating the objects is consistent with the order crystallized in the MST itself.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
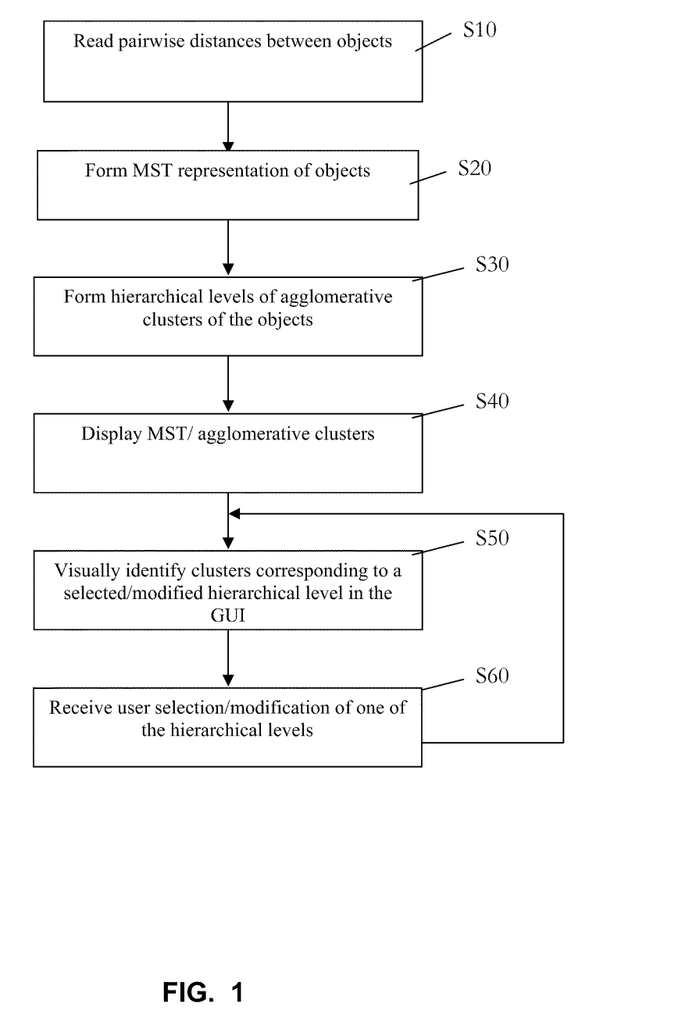
FIG. 1 is a flowchart of the visualization method according to an embodiment of the present invention.

In FIG. 1, a flowchart is shown which illustrates an embodiment of the present invention. In step S10, pairwise distances between objects are provided as input. This input can be in a distance matrix format. The distances can be metric or non-metric distances.

A MST can then be computed, based on the input distances. As explained earlier, the MST forms a spanning tree, a geometrical model which connects objects with minimal total weight, making it a convenient starting point for the representation to be formed next, step S20.

In addition, hierarchical clusters of objects are formed, step S30. More specifically, successive levels of hierarchic clusters are built, where the clusters agglomerate the same objects as otherwise spanned by the MST. The cluster arrangement that results from hierarchical clustering can be represented by a dendrogram as illustrated below. Incidentally, step 30 can actually occur before, after or parallel to step 20, since only the input distances are needed at this point.

Next, the representation formed for the MST at step S20 is displayed in a graphical user interface (GUI). In computer-aided techniques, the GUI plays an important role with regards to the efficiency of the technique. The GUI can have standard menu bars, as well as bottom and side toolbars. These menu and toolbars likely contain a set of user-selectable icons, each icon being associated with one or more operations or functions, as known in the art. In addition, the GUI typically includes a dedicated interactive component such as a slider which a user can use to set a parameter value by moving an indicator, pressing a button or filling a text box This interactive component can be manipulated using a haptic device such as a mouse, trackballs or touchpad, or a keyboard.

Upon user selection or modification of a given parameter (step S60), some of the clusters are visually identified in the same view as used for the representation of the MST. Here, the representation formed for the MST is still a geometrical representation, whereas a "view" is a pictorial representation.

The parameter is preferably a threshold, and the clusters are determined according to the selected threshold. For instance, the clusters corresponding to part or all of the hierarchical levels under the threshold are identified. Various design and rendering techniques can be relied upon. Notably, a representation of the hierarchy of levels of clusters (distinct from the clusters themselves) can be added to the representation of the MST.

In a preferred embodiment of the present invention, no cluster is visually identified, by default such as at the time of displaying the representation for the first time. Clusters will progressively appear in the GUI upon raising the threshold. Changing the threshold gives rise to identifying new clusters in the layout. Basic examples are discussed below.

The above method allows for obtaining a consistent aggregation of cluster information on top of local information between objects, enabling a better understanding of interrelations between objects. Consistency is first and foremost achieved thanks to the fact that the hierarchical levels of clusters agglomerate objects according to the same pairwise distances as used for computing the MST. These clusters can agglomerate objects which have the lowest pairwise distance between them.

In an embodiment of the present invention, only a subset of the pairwise distances can be used for building the clusters, namely the subset of pairwise distances corresponding to the edges in the MST, and to these edges only. Thus, if N objects are considered, N (N−1)/2 pairwise distances are expected, while only N−1 pairwise distances remain, which reflect the edges of the MST. Fewer distances have to be compared in the latter case, while maintaining the MST's consistency.

Other optional features of the invention are discussed in the following. In particular, there are several possibilities for forming both a geometrical representation of the MST and hierarchical levels of agglomerative clusters. Examples are notably discussed in reference to FIGS. 2 and 3.

Figure 2:
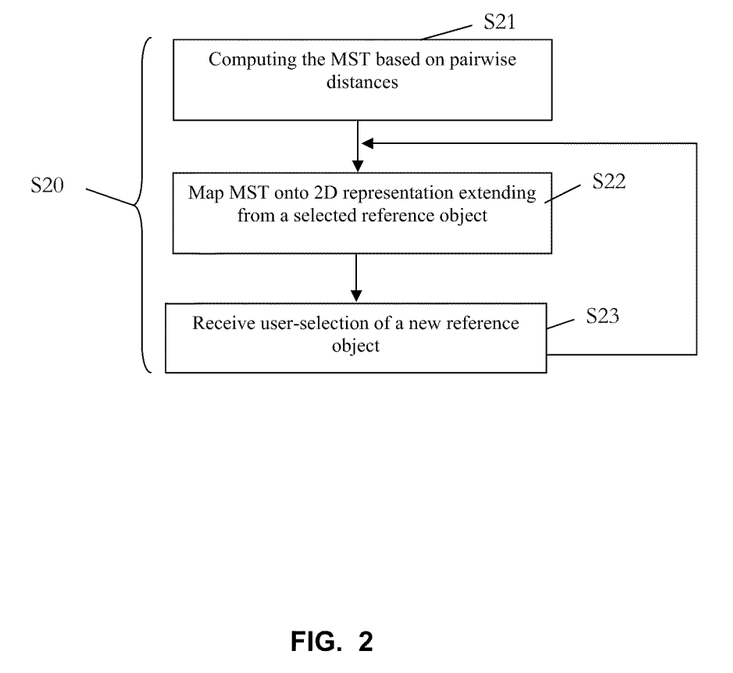
FIG. 2 is a detailed flowchart of step S20 in FIG. 1 which shows the formation of an MST representation, according to an embodiment of the present invention.
Figure 3:
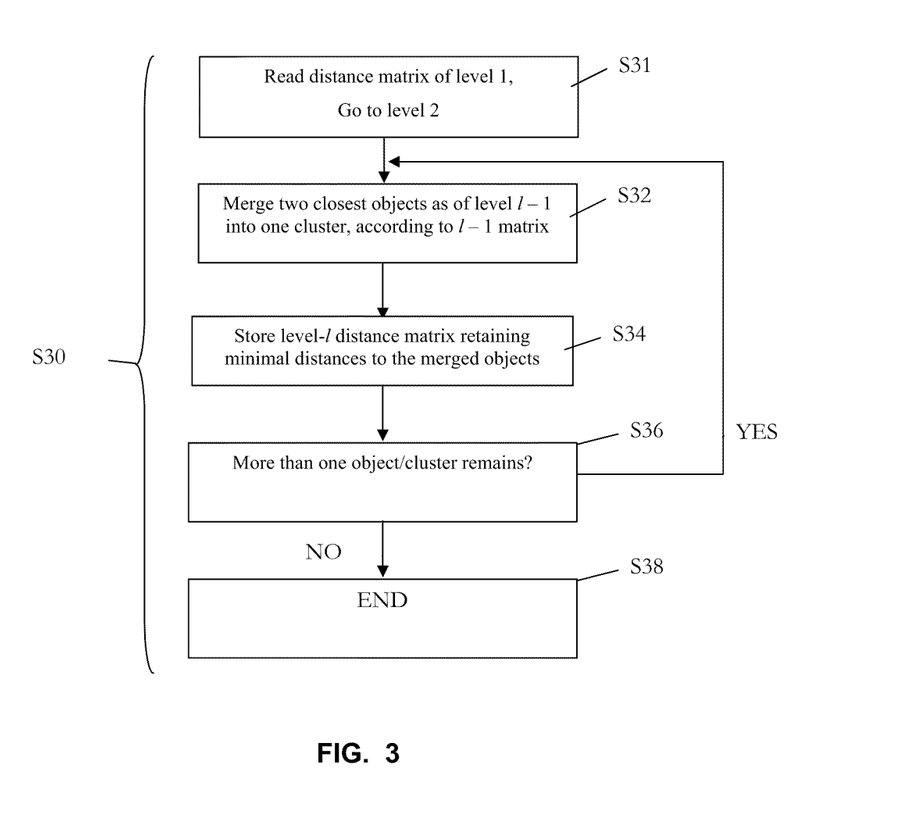
FIG. 3 is a detailed flowchart of step S30 in FIG. 1 which shows the formation of hierarchical levels of agglomerative clusters of the objects according to an embodiment of the present invention.

Most generally, the depicted flowcharts illustrate one possibility of ensuring that hierarchical clusters are consistent with the MST and furthermore non-overlapping. In fact, the order according to which the objects are merged will be the same as the order captured in the MST. Namely, forming the hierarchical levels of clusters includes progressively agglomerating the closest objects into clusters, according to pairwise distances as captured by the edges of the MST. By so doing, the clusters identified in the view shall not overlap, independently from the threshold selected.

In FIG. 2, a detailed flowchart is shown which actually expands step S20 in FIG. 1 into several sub-steps, describing the formation of an MST geometrical representation, according to an embodiment of the present invention. Forming the MST can decompose into:

(i) Computing the MST tree based on input distances, for which typical algorithms are known per se (step S21); and (ii) Mapping the MST onto a specific representation, step S22. The representation at stake is preferably a 2D representation. Furthermore, the representation advantageously extends from a reference object, which the user can select/modify interactively, in step S24. Several mapping techniques can be contemplated.

FIG. 3 is a flowchart expanding step S30 in FIG. 1 and gives more detail as to the computation of hierarchical levels of clusters, in an embodiment of the present invention. Clusters are built according to successive levels of agglomeration. At a given level, the two closest objects, which have the minimum distance between them in a given set of pairwise distances, are merged to form a first cluster in step 32. Then, step 32 is repeated at a subsequent level, when a third object is merged with the cluster, provided that its distance to one or the other of the previously merged objects is the next minimum distance in the given set of pairwise distances.

In practice, the following scheme can be implemented. First, the geometry corresponding to the input distances (or restricted to the sole MST edges) is first considered in step 31. For example, a working matrix of level 1 is accessed, which reflects the input distances.

Then, in step S32, at a subsequent level l, one merges the two closest objects A, B as of level l-1, thereby forming a cluster AB. The merged objects are the objects which are the closest according to the working distance matrix as of level l-1.

Next, the new working matrix as of level l is computed. Namely, the distances between the remaining unmerged objects and the previously formed cluster are recomputed. The minimum distance between any remaining object C and the cluster AB is taken as the minimum distance to one of the objects A or B in the cluster AB. Thus, if the distance from C to A (d(C, A)), is less than d(C, B), then d(C, A) is retained as the distance from C to the cluster AB (d(C, AB)), in the new matrix. The same applies to other objects D, E, with respect to the cluster AB. Interestingly, selecting the objects with the minimum distance to the cluster allows for full consistency with the MST computed.

At a subsequent step, the distance d(C, AB) can be compared to other distances d(X, Y), including the distances between the remaining objects and the cluster. If distinct objects, say D and E, are found to be the closest, then they are merged with each other. However, if d(C, AB) appears to be the smallest distance, then objects C and AB are merged into CAB. The distance from an object D to the new cluster CAB can be the minimum d(D, CAB)=Min (d(D, AB), d(D, C)), it being noted that d(D, AB) has already been computed at a previous level.

At each level, a new matrix is stored in view of a next merge operation in step S34. This process is repeated in step S36 by considering a cluster in place of the objects it aggregates, until only one final cluster remains in step S38. Accordingly, hierarchical levels (30) of clusters which agglomerate the closest objects are obtained. Yet, the final step of merging the last two objects/clusters can be safely omitted.

Figure 4:
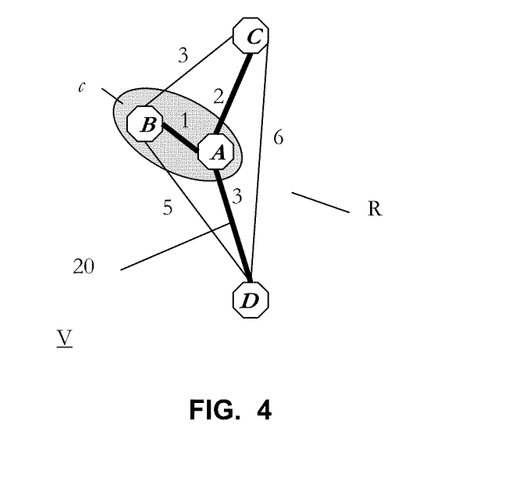
FIG. 4 is a representation of a simple graph and a corresponding minimum spanning tree where a given cluster is identified according to an embodiment of the present invention.

The above steps are now illustrated through a simple example, which is depicted in FIG. 4 according to an embodiment of the present invention. Namely, vertices A, B, C, and D are represented in a view V. The vertices are linked by unlabelled edges, which have weights which are labeled with numerals about the edges. Thick edges denote the MST 20 obtained for the graph according to the representation R depicted in the view V.

Running the algorithm discussed in reference to FIG. 3 can result in the following:

At level 1: starting from separate objects A, B, C, and D, the initial distance matrix can be noted as:
{{{A, B},1},{{A, C},2},{{A, D},3},{{B, C},3},{{B, D},5},{{C, D},6}}.

According to a variant evoked earlier, the matrix can be conveniently reduced according to the MST, resulting in:
{{{A, B},1},{{A, C},2},{{A, D},3}}.
Note that the above matrix is also a sufficient mathematical representation of the MST.

Next, at level 2, merging the closest objects A and B according to the MST or in absolute, results in the cluster c=AB, identified in the pictorial representation or the displayed view by a surrounding oval. Here the cluster c is identified directly in relation to the objects of the representation R such as the agglomerated objects A, B. A new matrix is stored, reflecting the previously formed cluster c=AB. Retaining minimum distances to A or B gives:

{{{AB, C},2},{{AB, D},3}}
Accordingly, the next step of level 3 can result in merging AB and C resulting in a cluster ABC. This creates a corresponding matrix {{ABC, D},3}. The very last step, if necessary, merges ABC and D.

For example, selecting a threshold intermediate between level 2 and 3, the sole cluster that corresponds to a level immediately under the threshold selected is identified, namely the cluster AB, corresponding to level 2 in FIG. 4. More generally, each of the largest clusters of a hierarchical level immediately under the selected threshold is identified. However, objects in level 1 are not clusters yet and are already identified in the view. Therefore, these objects do not need additional identification. Similarly, the final cluster in the last level does not need to be identified.

Next, FIGS. 5-8 illustrate the mapping of an MST onto a 2D representation in an embodiment of the present invention. Using a 2D representation such as a 2D geometric model of the MST is convenient for 3D rendering, as it can be rendered in a 3D view, where the third dimension can still be used to render additional information.

Figure 5:
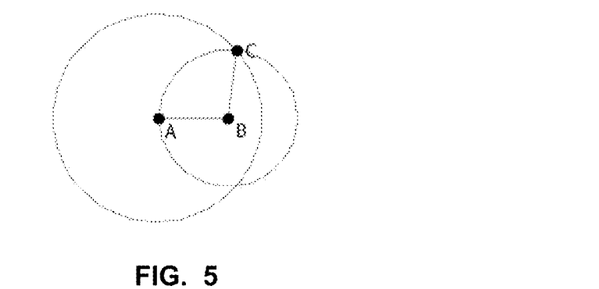
FIGS. 5-8 illustrate the mapping of a MST onto a 2D representation extending from a reference object, through a simple example according to an embodiment of the present invention.
Figure 6:
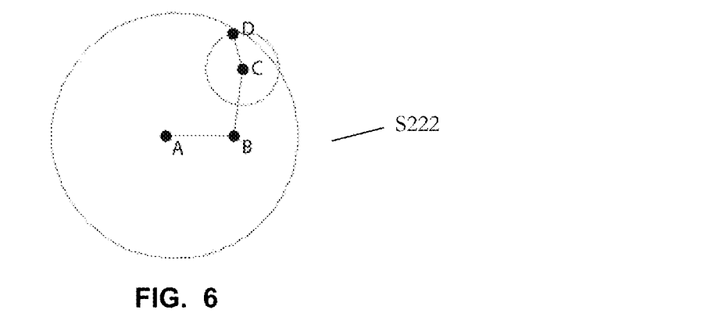
Figure 7:
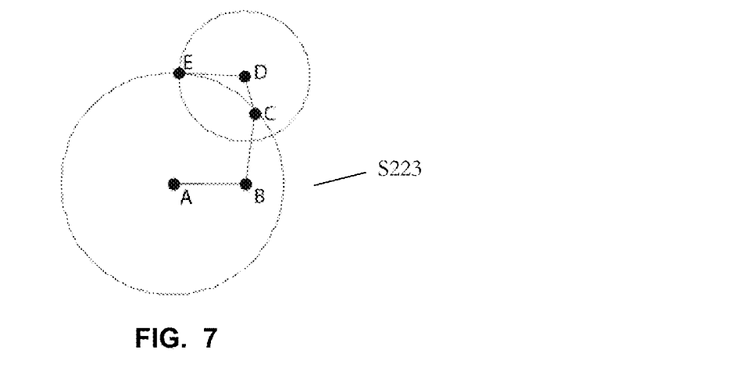

First, the minimum spanning tree is computed on a pairwise distance matrix. Next, the mapping can commence by arranging objects, represented by nodes of the MST graph, with respect to a reference object that the user designates.

The representation can be constrained to preserve a first subgroup of distances between the objects such as the first-neighbor distances. Similarly, the representation can further be constrained to preserve a second subgroup of distances, such as distances from the reference object to remaining objects. Note that if non-metric distances are given as input, the second subgroup of distances cannot be exactly preserved. Both the first and the second subgroups of distances are consistent with the input distances in order to achieve a representation consistent with the clustering process. Furthermore, it can be appreciated that the MST representation should preferably augment or maintain the semantics contained in the sole MST graph, such as to simply enable a consistent overlay of cluster information, on top of the representation.

Figure 8:
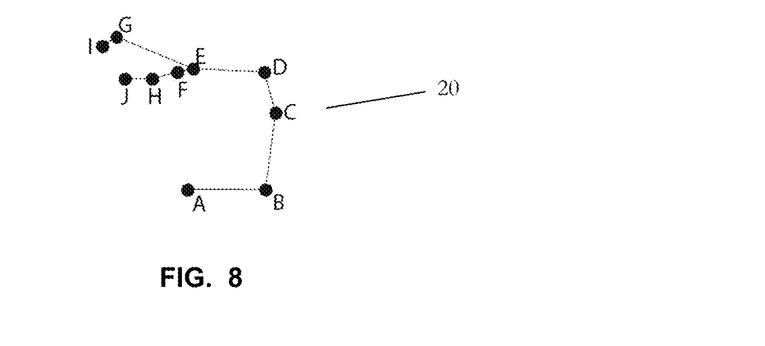

Suppose that the first two objects A and B of the MST are already mapped. The objects A, B are denoted by corresponding points A and B in FIG. 5. Assume now that the second distance preserved is the distance with respect to the reference point which in the present case is the first point. The third point C can be mapped at the intersection of circles centered at the reference points. Namely, circles are centered at A and B with radii equal to the distance between A and C (d(A, C)) and the distance between B and C (d(B, C)), respectively. In the case of metric distance, the circles intersect at a single degenerate point (tangent) or two distinct points, assuming A is distinct from B. In the latter case, any of the intersection points preserves the original distances towards the reference point A and point B and can be retained, as shown in FIG. 5. The fourth point D is mapped at the intersection of circles centered on A and C in FIG. 6 and the fifth point is mapped similarly in FIG. 7. The process continues until all points of the MST at positioned in the 2D plane as shown in FIG. 8. Accordingly, a scheme is obtained which enables the exact preservation of the two subgroups of metric distances.

Obviously, the above discussion assumes that the underlying distances obey the triangle inequality, such that the circles necessarily intersect. For more details on this, please BLUM et al., "A Triangulation Method for the Sequential Mapping of Points from N-Space to Two-Space", IEEE Transactions on Computers, 1977, 288-292, vol. C-26, Issue 3. However, there are situations where the distance function can violate the triangle inequality such as with dynamic time warping and with a longest common subsequence. In these cases, the corresponding reference circles can not necessarily intersect.

Figure 9:
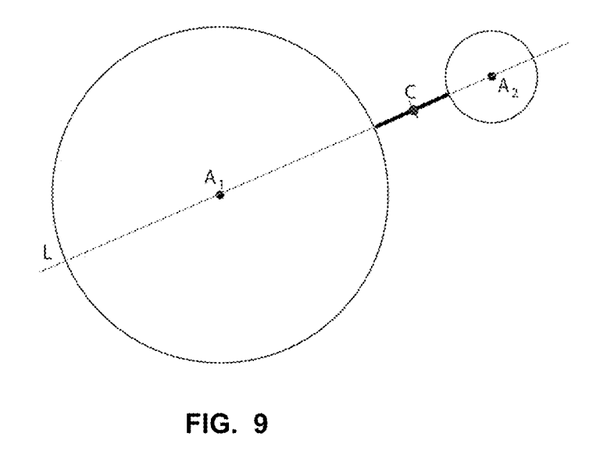
FIGS. 9-11 are examples of how a 2D mapping of an MST can be achieved in more complex cases such as when distances between objects are non-metric according to an embodiment of the present invention.
Figure 10:
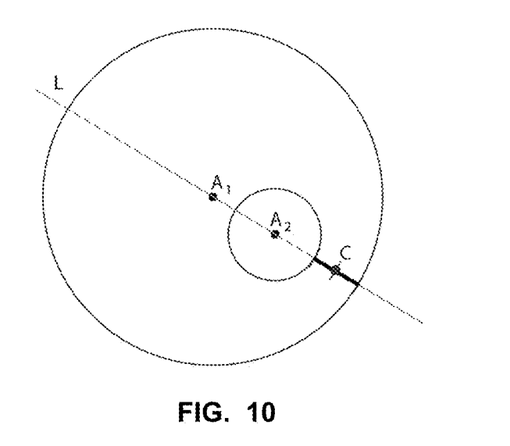
Figure 11:
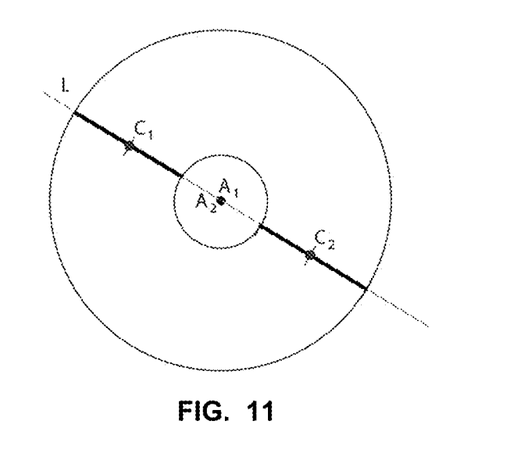

Thus, in the following, extensions are highlighted that allow a proper management of non-metric distances, as shown in FIGS. 9-11 according to an embodiment of the present invention. We can identify two cases of non-intersecting circles: (i) nested circles as in FIG. 10 or 11 and (ii) circles that do not overlap, as in FIG. 9.

In each of these cases, we need to identify a suitable position for placing the "third" point C, with respect to two circles centered on first point $A_1$ and second point $A_2$, respectively. In order words, the locus of points that minimize the sum of distances to the perimeters of two circles needs to be identified. When the two circles do not intersect, the desired locus always lies on the line L connecting the centers of the two circles.

The case (i) decomposes into two sub-cases, as illustrated in FIGS. 10 and 11, respectively. When the two circles have a same center (FIG. 11), there are two degenerate points $C_1$ and $C_2$ that minimize the distance to the circumferences of the circles, located on a respective segment on each side of the center. Any one of these can be retained. In the case of eccentric circles (FIG. 10), only one segment minimizes the distance between the peripheries. The point C at the middle of such a line segment can be retained.

The second case (ii) can be resolved in a similar way, as shown in FIG. 9. Just as in FIG. 10, only one segment minimizes the distance (thick segment) between the circumferences.

More generally, the above scheme extends to metric distances, since a segment, in the case of metric distances, can reduce to a point. Accordingly, given a reference object A, an object C to be mapped and an object previously mapped B, one can position the object C at the center of a single or degenerate segment which minimizes the distance between the circumferences of two circles, centered on A and B, with radii equal to the distances d(A, C) and d(B, C), respectively. An algorithm implementing the above scheme can indistinctly allow for MST based on metric or non-metric distances to be mapped as close as possible to the original distances.

With the addition of the above scheme, mapping positions of the objects on a two-dimensional plane is possible, so that the original pairwise distances are preserved. Examples are given in FIGS. 13-16 according to an embodiment of the present invention.

Figure 12:
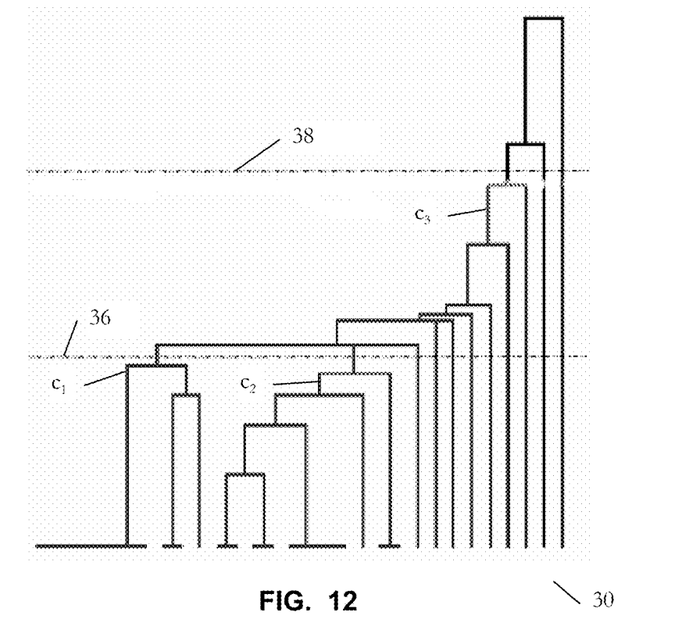
FIG. 12 shows an example of a dendrogram graphical representation suited for hierarchical levels of clusters, according to an embodiment of the present invention.

In an embodiment of the present invention, a graphical representation of the hierarchy of the levels of clusters is displayed in order to better comprehend relations between objects and interact with the view. The hierarchical levels of clusters can be represented by a dendrogram overlaid on the objects as in the MST representation. FIG. 12 shows an example of representation via a dendrogram 30 of hierarchical levels of clusters, where a line threshold can be moved by the user via a slider or knob according to an embodiment of the present invention.

Two exemplary threshold positions 36 and 38 are represented. As said earlier, no cluster is identified by default in a preferred embodiment of the present invention. Clusters are instead identified in the view upon selection of a given threshold. Raising the threshold can give rise to the identification of new clusters in the layout. For example, before selecting a specific threshold, all objects are meant to be displayed in the view. Selecting the first threshold position 36 can result in identifying the two clusters $c_1$ and $c_2$ in the view which are the largest clusters immediately under the selected threshold. Raising the threshold to position 38 can trigger the identification of $c_3$. In a preferred embodiment of the present invention, when triggered, the identification of a higher level cluster such as $c_3$ is substituted for the identification of lower level clusters such as $c_1$ and $c_2$, in order to better render the affinities between objects.

Figure 13:
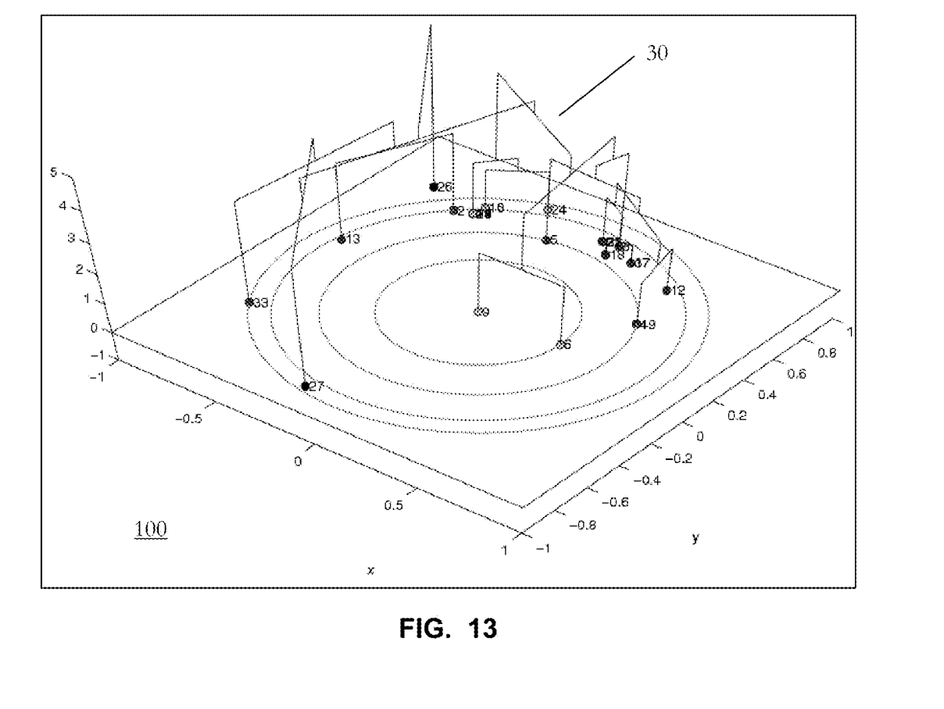
FIG. 13 exhibits a dendrogram, as in FIG. 11, which is overlaid on a 2D representation of the MST, according to an embodiment of the present invention.

FIG. 13 shows this dendrogram overlaid on a 2D representation of an MST, where vertices are numbered according to an embodiment of the present invention. The resulting view is displayed in a GUI 100. As opposed to FIG. 4 which showed a front view of the MST representation, the view is now a 3D rendering of the 2D representation of the MST with the overlaid dendrogram. This allows for the identification of the clusters at all levels at the same time.

Many details in the depicted view, as well as in the GUI are omitted for clarity. In particular, edges are not shown. Yet, one can appreciate the advantages resulting from the cluster's construction. Namely, the two closest objects are merged into one cluster and the distances between the remaining objects to the cluster are recomputed, in such a way that minimum distances between objects are favored in the merging process. Due to the construction of the MST which always merges the closest objects, this enables a perfect overlay of the dendrogram on top of the MST representation. In addition, relying on a 2D representation for the MST, a 3D rendering allows for a better distribution of the global information such as the MST representation and hierarchy.

Incidentally and amongst other implementation details, vertices can be colored or patterned based on the cluster they belong to, given the dendrogram clustering. Here, a grayscale is relied upon.

One objective is to achieve a way of portraying the clustering information in a representation that already allows for the preservation of local relations. Based on the pairwise distances given as input, a hierarchical dendrogram can be built as shown in FIG. 12 according to an embodiment of the present invention. The dendrogram construction progresses as described in the flowchart of FIG. 3 according to an embodiment of the present invention.

Merging the clusters in a different way such as using the average distance between the objects in a cluster can result in overlapping clusters of objects and/or hierarchies of clusters which are not necessarily neighbors in the MST mapped representation.

Next, the hierarchical view enables users to change the cut-off merge threshold in visual relation to a hierarchy such as a dendrogram. This allows for improved control on the interactive formation of incrementally larger or smaller clusters.

Figure 14:
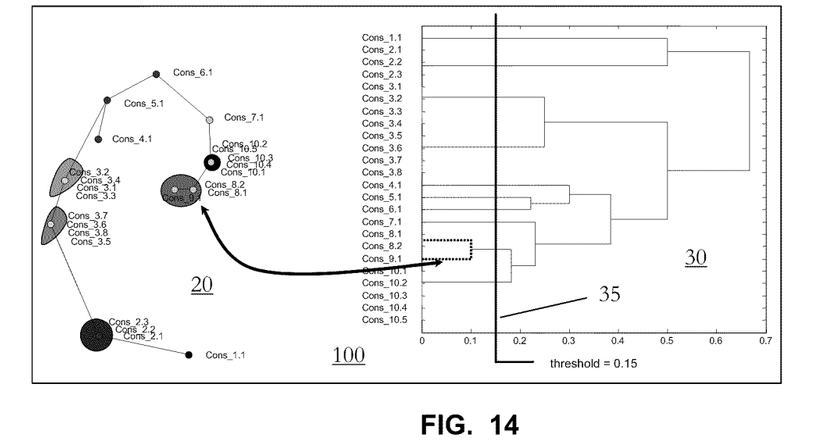
FIGS. 14-16 are screenshots illustrating how the user can interactively modify a level in a hierarchy of clusters and visualize the obtained clusters according to an embodiment of the present invention.
Figure 15:
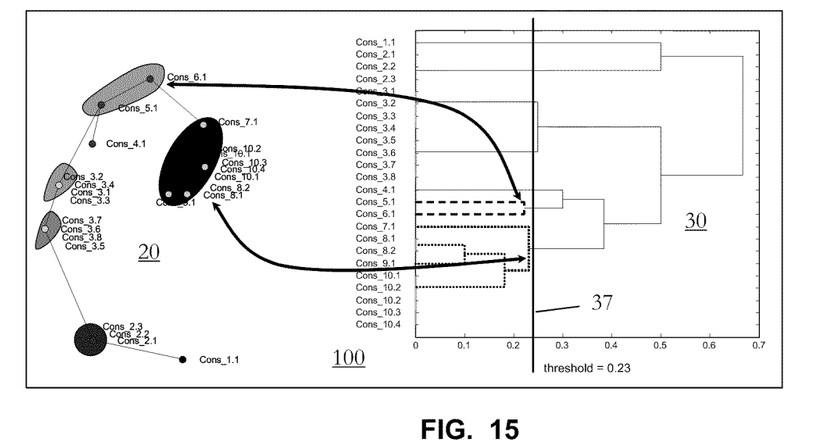
Figure 16:
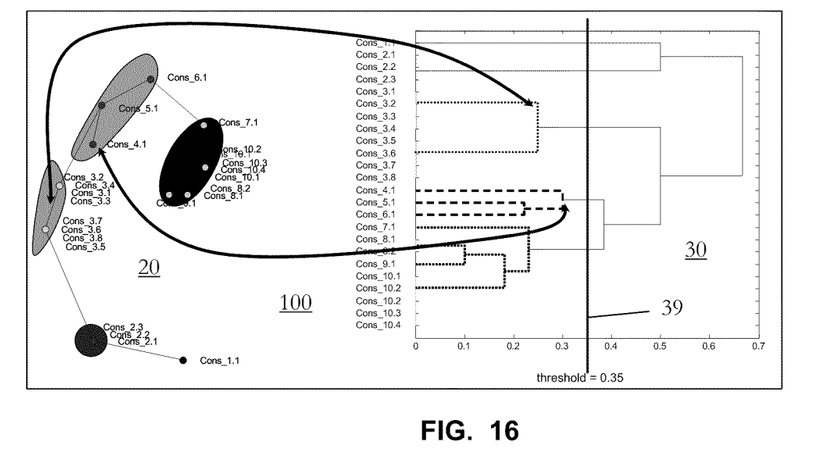

This functionality is shown in FIGS. 14-16, which are screenshots illustrating how a user can interactively modify the cut-off threshold and see the clusters according to an embodiment of the present invention. In each of the FIGS. 14-16, the left-hand side depicts the MST representation 20 and the clusters identified according to a given threshold. The right-hand side contains the hierarchy of clusters 30. By increasing the merging threshold 35, 37, 39 as shown in FIGS. 14 to 16, objects are progressively merged together thereby indicating their affinity and relationships, similar to FIG. 12. Note that here the layout chosen for the dendrogram differs from that of FIG. 13. The two 2D views are superimposed, instead of a 3D rendering. In this respect, various layout possibilities can be provided as alternatives to the user.

The data analyzed in this embodiment of the present invention relate to marketing products and services. This embodiment of the present invention is used as tool of consumer marketing research. However, the exact nature of the data at issue is unimportant, as long as pairwise distances or affinities between objects are also provided. These can be represented by the edges of a graph where the vertices represent the objects.

Yet, for completeness, the data provided include affinities between consumers Cons_i.j, where i can denote a given generic name, brand or sign such as the "X Group" while j is for a specific branch or agency such as "X France". For the sake of clarity, consumers Cons_i.1, Cons_i.2, Cons_i.3, etc. are mapped on the same position. They can be considered as degenerate vertices and appear as a single vertex with several associated labels such as Cons__10.1-5. A cluster identifies the degenerate vertices as soon as the threshold exceeds 0. The affinities can be derived from suitable correlations between goods/products bought by the consumers.

In FIG. 14, the threshold level is 0.15 which is larger than zero according to an embodiment of the present invention. The clusters identifying degenerated objects are represented on the left hand side. As emphasized by the curved double-arrow, the chosen threshold level results in identifying one cluster such as aggregating Cons__9.1 and Cons__8.1-8.2. It is named Cons__8.m to indicate that it is a degenerate object.

Thanks to the implemented zoom control, the user can interactively manipulate the zoom level in order to formulate clusters of different granularities. In particular, when the threshold is raised to 0.23 as shown in FIG. 14 and FIG. 15, an additional cluster appears, aggregating the objects Cons__5.1-Cons__6.1. Furthermore, the cluster that was previously aggregating Cons__9.1 and Cons__8.m now extends to Cons__7.m and Cons__10.m.

Finally, when the threshold is raised to 0.35 as shown in FIG. 16, an additional cluster appears which aggregate all objects Cons__3.m, and the previous cluster Cons__5.1-Cons__6.1 is now extended to Cons__4.1.

A typical interpretation is the following: if the reference object or pivot Cons__9.1 has bought certain products, then one can recommend the same products to any one of Cons__7.1 to Cons__10.5 in that order. This follows the same approach as with Cons__9.1. Next, one can target the cluster Cons__4.1-6.1, yet with a slightly different strategy. Accordingly, the visualization not only identifies groups of customers to focus on, but also gives the order of steps for targeting the groups.

These embodiments of the present invention notably provide a way of interactively illustrating both affinity between objects and overlaying cluster information. Thus, they mitigate several shortcomings of previously known techniques. In these embodiments of the present invention, the method retains a subset of relevant distances. It can for instance preserve first-neighbor distances as well as distances to a pivot point. The local structure is thereby preserved. Moreover, the present method can, in embodiments of the present invention, fuse 2D mapping techniques with additional control for resolving the cluster structure with selectable granularity. The hierarchy of clusters can be captured in a dendrogram overlaid on a third dimension which protrudes from the 2D plane of the MST representation and branching on the objects. This allows cluster information to be optimally correlated to local information by the user. The user can furthermore interactively display the cluster information at various granularities. For instance, starting at small, low-level clusters and gradually moving to higher level cluster structures. Embodiments of the present invention can also offer meaningful ways of data exploration in the following application areas:

Business Intelligence. An important task of marketing teams of large companies is identifying groups of customers with similar buying characteristics otherwise known as market segmentation. Embodiments of the present invention can simplify tasks such as revealing meaningful customer clusters with the aid of the interactive, multi-resolution feature of the methodology.

Expanding on the above notion, it is of interest not only to identify groups of customers interested in certain products but also the type of approach to those customers. With the inclusion of the neighborhood graph, tasks can be attacked in a more informative way, as illustrated in FIGS. 14-16 according to an embodiment of the present invention.

Advancing the understanding of Genetic Evolution: embodiments of the present invention can be tailored to identify hierarchical cluster evolutions, which can be coupled with DNA analyses. DNA sequences consist of thousands or millions of nucleotides, making their visualization difficult. However, using embodiments of the present invention, relationships and phylogenies of species can be orderly portrayed and understood.

Based on the above discussion and examples of applications, one can summarize the various advantages of the proposed techniques as follows:

1. The preservation of both local and non-local structure due to the mapping technique;

2. Concurrent visualization of neighborhood and cluster structures;

3. Multi-granular data visualization: the user can select the desired visualization (zoom-in/zoom-out capability);

4. Ease of interpretation: the disclosed techniques can involve various visualization primitives with which users have interacted before. The consistent and natural interaction of the primitives is ensured by a consistent processing of data since cluster information and the 2D representation are based on the same MST distances, or at least on the same pairwise distances.

5. The disclosed techniques are agnostic to the distance function. The input can be any distance matrix between objects and the distance function can be either metric or non-metric. This enables analysis of distances which obey or not obey triangle inequality.

While the present invention has been described with reference to certain embodiments, it will be understood by those skilled in the art that various changes can be made and equivalents can be substituted without departing from the scope of the present invention. In addition, many modifications can be made to adapt a particular situation or material to the teachings of the present invention without departing from its scope. Therefore, it is intended that the present invention not be limited to the particular embodiment disclosed, but that the present invention will include all embodiments falling within the scope of the appended claims. For example, many rendering options, layouts and variants can be contemplated, which have been omitted here for conciseness.

The invention claimed is:

1. A visualization method for visualizing affinities between a plurality of objects, the method comprising the steps of:
   forming a representation of a minimum spanning tree wherein said minimum spanning tree connects said plurality of objects based on a pairwise distance between said plurality of objects;
   forming a hierarchical cluster of said plurality of objects wherein said hierarchical cluster comprises a level;
   agglomerating said plurality of objects based on said pairwise distance;
   displaying a view of said representation of said minimum spanning tree in a graphical user interface;

receiving a user selection of a parameter containing a hierarchical level; and identifying, in said view, a target cluster that corresponds to said hierarchical level;

wherein at least one of the steps is carried out using a computer device so that affinities between said plurality of objects are visualized.

2. The method according to claim 1 wherein said forming said hierarchical cluster comprises the step of:

agglomerating said plurality of objects into clusters, according to a close pairwise distance which corresponds with an edge of said minimum spanning tree.

3. The method according to claim 1, wherein said agglomerating step comprises the steps of:

forming a cluster by merging at least two of said plurality of objects having a minimum pairwise distance between said plurality of objects; and merging a third object with said cluster if the distance between said third object and said at least two of said plurality of objects is the next minimum pairwise distance between said plurality of objects.

4. The method according to claim 3, wherein said forming step further comprises the steps of:

storing a remaining minimum pairwise distance, within said given level, between a remaining object and said cluster; and repeating said forming step, until a single, remaining cluster remains;

wherein said minimum pairwise distance is a minimum level pairwise distance between said plurality of objects on a given level.

5. The method according to claim 1, wherein said identifying step comprises the steps of:

visually identifying said hierarchical cluster and said agglomerated plurality of objects in said representation; and displaying a graphical representation of said hierarchical cluster.

6. The method according to claim 5, wherein said graphical representation is a dendrogram overlaid on said plurality of objects within said representation.

7. The method according to claim 1, wherein said forming said representation step comprises the steps of:

computing said minimum spanning tree;

receiving a selection of a reference object; and mapping said minimum spanning tree onto said representation wherein said representation extends from said reference object.

8. The method according to claim 7, wherein said forming said representation step comprises the step of:

mapping said minimum spanning tree onto a 2D representation.

9. The method according to claim 8, wherein said representation is constrained to preserve:

a first subgroup of distances between said plurality of objects; and a second subgroup of distances between said plurality of objects;

wherein both first and second subgroups of distances are consistent with at least one input distance.

10. The method according to claim 9, wherein said first subgroup corresponds to first-neighbor distances.

11. The method according to claim 9, wherein said second subgroup comprises a distance between said reference object and a remaining object.

12. The method according to claim 11, wherein forming the representation comprises the step of, given a reference object A, an object C to be mapped and an object previously mapped B:

positioning a new object at the center of a single or degenerate segment which minimizes a distance between a first circumference of a first circle centered on said reference object and a second circumference of a second circle centered on a previously mapped object, with a radii equal to a first distance between said reference object and said new object and a second distance between said previously mapped object and said new object, said segment restricting to a point, whereby said minimum spanning tree can be mapped based on metric or non-metric distances.

13. The method according to claim 1, wherein said receiving step further comprises the step of:

identifying a largest hierarchical cluster which is under said threshold;

wherein said selected parameter is a threshold for said hierarchical level.

14. The method according to claim 1 wherein said hierarchical cluster is said target cluster.

15. A system for visualizing affinities between a plurality of objects, comprising:

a forming module adapted to form a representation of a minimum spanning tree wherein said minimum spanning tree connects said plurality of objects based on a pairwise distance between said plurality of objects;

a forming module adapted to form a hierarchical cluster of said plurality of objects wherein said hierarchical cluster comprises a level;

an agglomerating module adapted to agglomerate said plurality of objects based on said pairwise distance;

a displaying module adapted to display a view of said representation of said minimum spanning tree in a graphical user interface;

a receiving module adapted to receive a user selection of a parameter containing a hierarchical level; and an identifying module adapted to identify, in said view, a target cluster that corresponds to said hierarchical level.

16. A non-transitory computer readable storage medium tangibly embodying a computer readable program code having computer readable instructions which when implemented, cause a computer to carry out the steps of a method comprising:

forming a representation of a minimum spanning tree wherein said minimum spanning tree connects said plurality of objects based on a pairwise distance between said plurality of objects;

forming a hierarchical cluster of said plurality of objects wherein said hierarchical cluster comprises a level;

agglomerating said plurality of objects based on said pairwise distance;

displaying a view of said representation of said minimum spanning tree in a graphical user interface;

receiving a user selection of a parameter containing a hierarchical level; and identifying, in said view, a target cluster that corresponds to said hierarchical level.

* * * * *